United States Patent

Rozental et al.

[11] Patent Number: 6,141,905
[45] Date of Patent: Nov. 7, 2000

[54] PROCESS AND APPARATUS FOR UTILIZING ANIMAL EXCREMENT

[75] Inventors: Yakov Rozental, Nazareth-Illit; Matitiahu Fichman; Kim Shuster, both of Haifa; Leonid Moldavsky, Nazareth-Illit; Leonid Aizikovich, Haifa, all of Israel

[73] Assignee: Supersoil Systems, Nof Ayalon, Israel

[21] Appl. No.: 09/303,643

[22] Filed: May 3, 1999

Related U.S. Application Data

[63] Continuation-in-part of application No. PCT/US97/21663, Dec. 1, 1997.

[51] Int. Cl.[7] .................................................. A01B 79/00
[52] U.S. Cl. ........................................ 47/58.1; 47/1.01 R
[58] Field of Search ................... 71/8, 22, 9, 21; 219/679, 695, 635, 678, 690; 210/606, 609, 610, 613, 623, 629; 422/21; 34/259, 263; 47/1.01 R, 58.1

[56] References Cited

U.S. PATENT DOCUMENTS

| | | | |
|---|---|---|---|
| 5,472,475 | 12/1995 | Adam | 711/13 |
| 5,500,306 | 3/1996 | Hsu et al. | 429/17 |
| 5,741,346 | 4/1998 | Glover | 71/15 |
| 5,810,903 | 9/1998 | Branconnier et al. | 71/9 |
| 5,951,947 | 9/1999 | Hunt | 422/21 |

*Primary Examiner*—Robert E. Pezzuto
*Attorney, Agent, or Firm*—Mark M. Friedman

[57] ABSTRACT

A process for the manufacture of a product useful as an artificial soil, soil conditioner or peat substitute, effected by subjecting an aqueous mixture containing a substantially solid feed excrement from animals and water to treatment with an alternating electric current at a frequency of a predetermined magnitude and for a predetermined period of time, such that an odorless solid product capable of absorbing several times its own weight of water is recoverable by water removal.

12 Claims, 4 Drawing Sheets

US 6,141,905

PROCESS AND APPARATUS FOR UTILIZING ANIMAL EXCREMENT

This is a continuation-in-part of PCT/US97/21663, filed Dec. 1, 1997.

FIELD AND BACKGROUND OF THE INVENTION

The present invention relates to a process and apparatus for utilizing animal excrement and, more particularly, to a process for the manufacture of an animal excrement based product useful as an artificial soil, soil conditioner or peat substitute, an apparatus for effecting the process and an animal excrement based product useful as an artificial soil, soil conditioner or peat substitute manufactured according to the process.

The need for soil conditioning in agriculture (especially in small-scale agriculture known as "market gardening") and in horticulture, is well known, for example, in order to lighten clayey soils, to improve the consistency of sandy soils and particularly to improve the moisture-holding capacity of many kinds of soils.

Peat is a carbonaceous substance—probably an intermediate in the formation of lignite and coal—formed by partial decomposition of certain plants growing in bogs and swamps, and, apart from its well-known use as a fuel, is popularly used, because of its open porous texture and high water-absorptive capacity, as a soil conditioner. Additionally, peat is used as bedding material for livestock, e.g., cattle and horses (including racehorses).

However, because of ecological problems, a number of countries have forbidden the mining of peat; moreover, in countries where peat is not mined locally, the cost of transportation from the countries of origin can make this product prohibitively expensive. For these reasons, there is a need in the market, particularly in countries where peat is expensive, for a peat-substitute having similar properties to natural peat.

While animals have been utilized for human needs for many centuries, it is only in the modern era, with a much greater density of the human population and increasing awareness of problems associated with ecology, health and hygiene, that it has been realized that animal excrement (including particularly, but not limited to, that of herbivorous animals which are customarily bred farmed and otherwise used on a large-scale), can present environmental problems such as biological pollution e.g., of the air, ground and water.

For this reason, use of raw animal excrement directly as a manure is to be avoided. The removal and economic utilization of animal excrement is therefore highly desirable. While this need has been met in part by artificial composting, such a process requires, for viability, a large-scale operation using expensive equipment for aerobic and anaerobic operation, and is unsuitable for relatively small-scale operations.

Natural composting, on the other hand, requires a lot of space, is labor-intensive, and does not avoid environmental hazards. Thus, the need for economic utilization of animal excrement still remains. It has surprisingly been found by the present inventors that both, the need for a peat-substitute and the need for useful and economic disposal of the excrement of animals in captivity can both be met by the process and apparatus of the present invention.

There is thus a widely recognized need for, and it would be highly advantageous to have, (i) a process for the manufacture of an animal excrement based product useful as an artificial soil, soil conditioner or peat substitute, (ii) an apparatus for effecting the process and (iii) an animal excrement based product useful as an artificial soil, soil conditioner or peat substitute manufactured according to the process.

SUMMARY OF THE INVENTION

According to the present invention there is provided a process for the manufacture of an animal excrement based product useful as an artificial soil, soil conditioner or peat substitute, an apparatus for effecting the process and an animal excrement based product useful as an artificial soil, soil conditioner or peat substitute manufactured according to the process.

According to one aspect of the present invention there is provided a process for the manufacture of a product useful as an artificial soil, soil conditioner or peat substitute, comprising the step of subjecting an aqueous mixture containing a substantially solid feed excrement from animals and water to treatment with an alternating electric current at a frequency of a predetermined magnitude and for a predetermined period of time, such that an odorless solid product capable of absorbing several times its own weight of water is recoverable by water removal.

According to further features in preferred embodiments of the invention described below the animals are herbivorous animals.

According to still further features in the described preferred embodiments a ratio of the substantially solid feed to water falls within a range of about 1:1 to about 1:4 by volume.

According to still further features in the described preferred embodiments the alternating electric current has a potential within a range of about 10 to about 1000 volts;

According to still further features in the described preferred embodiments the time period falls within a range of about 5 seconds to about 10 minutes.

According to still further features in the described preferred embodiments the recovered solid product is capable of absorbing at least six times its own weight of water.

According to still further features in the described preferred embodiments the frequency of the predetermined magnitude is in a range of 5 Hz–200 kHz.

According to still further features in the described preferred embodiments, when recovered the odorless solid product is capable of absorbing 3–10 times its own weight of water.

According to still further features in the described preferred embodiments the odorless solid product is also biologically sterile.

According to still further features in the described preferred embodiments the treatment is effected by flowing the aqueous mixture through a reactor, the reactor including a mechanism for providing the alternating electric current.

According to still further features in the described preferred embodiments the substantially solid feed includes raw animal excrement.

According to still further features in the described preferred embodiments the substantially solid feed includes a mixture of animal excrement with paper mill sludge.

According to still further features in the described preferred embodiments a ratio of animal excrement to paper mill sludge, falls within a range of about 1:10 to about 10:1 by volume.

According to another aspect of the present invention there is provided an odorless, microbiologically sterile and porous product capable of absorbing several times its own weight of water, useful as an artificial soil, soil conditioner or peat substitute, and which is obtainable by the process defined herein.

According to yet another aspect of the present invention there is provided a product useful as an artificial soil, soil conditioner or peat substitute comprising an electrically treated excrement from animals, the product being odorless, porous, microbiologically sterile and capable of absorbing several times its own weight of water.

According to still another aspect of the present invention there is provided an apparatus for the manufacture of an odorless and porous solid product capable of absorbing several times its own weight of water, useful as an artificial soil, soil conditioner or peat substitute, the apparatus comprising a line including in sequence (a) a first mechanism for providing a substantially solid feed including excrement from animals into the apparatus; (b) a second mechanism for forming an aqueous mixture of the substantially solid feed with water; (c) a reactor mechanism for subjecting the aqueous mixture to treatment with an alternating electric current at a predetermined frequency; and (d) a third mechanism for separating excess liquid from a product resulting from the reactor mechanism and for recovering the solid product.

According to still further features in the described preferred embodiments the reactor mechanism includes a generally elongate, tubular reactor defining a reactor space bounded by insulated wall mechanism, inlet and outlet mechanism for flowing aqueous mixture through the reactor space, and phase and zero electrodes cooperatively disposed within the reactor space and connected to a supply of alternating electric current having a frequency within the range of 5 Hz–200 kHz, thereby providing mechanism for applying the current to the aqueous mixture when the mixture flows through the reactor space.

According to an additional aspect of the present invention there is provided a reactor mechanism for use in an apparatus for the manufacture of an odorless and porous solid product capable of absorbing several times its own weight of water, useful as an artificial soil, soil conditioner or peat substitute, the reactor mechanism comprising a reactor defining a reactor space bounded by insulating wall mechanism, the reactor including inlet and outlet mechanisms for flowing aqueous mixture through the reactor space, and phase and zero electrodes being cooperatively disposed within the reactor space and being connected to a supply of alternating electric current having a predetermined frequency, thereby providing mechanism for applying the current to the aqueous mixture when the mixture flows through the reactor space.

Thus, it is a principal object of the present invention to provide a product useful as an artificial soil, soil conditioner or peat substitute, as well as a process and apparatus directed to the manufacture thereof.

A further object of the invention is to provide for the economic, useful, hygienic and ecology-friendly utilization of animal excrement.

Another object of the invention is to provide for the utilization of paper mill sludge.

Still another object of the invention is to provide a product which is potentially useful as a hygienic bedding material for livestock.

Other objects of the invention will appear from the description which follows.

BRIEF DESCRIPTION OF THE DRAWINGS

The invention herein described, by way of example only, with reference to the accompanying drawings, wherein.

DESCRIPTION OF THE PREFERRED EMBODIMENTS

Figure 1:
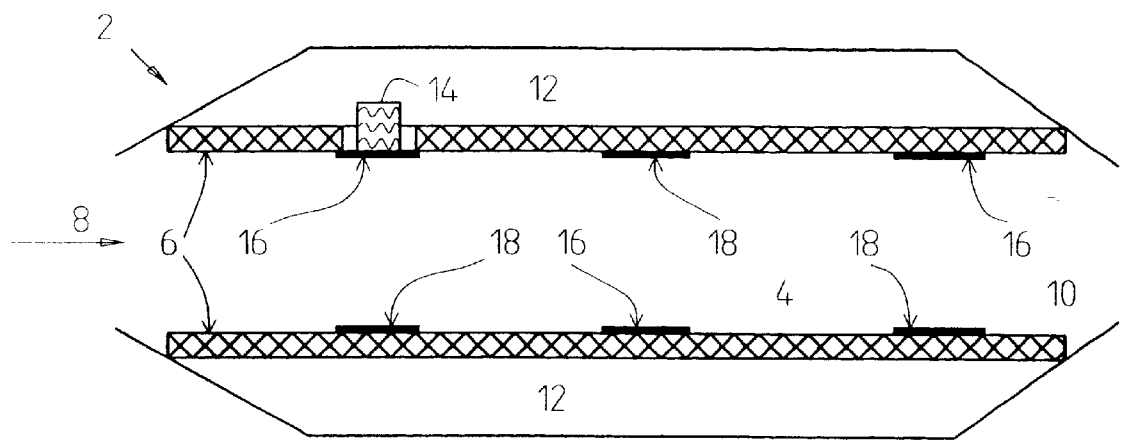
FIG. 1 illustrates an embodiment of a reactor of the invention, useful in the process of the invention and which may form part of the apparatus of the invention.

The present invention is of a process and apparatus for utilizing animal excrement which can be used for the manufacture of an animal excrement based product useful as an artificial soil, soil conditioner or peat substitute. Specifically, the present invention can be used to provide an odorless, microbiologically sterile and porous product capable of absorbing several times its own weight of water, useful as an artificial soil, soil conditioner or peat substitute, and which is obtainable by the process of the invention.

The principles and operation of the process and apparatus according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The "substantially solid feed" which is the starting material for the process of the invention is intended to include substantially solid excrement of animals in captivity which may be in the raw state. Moreover, it was found that the feed may comprise a mixture of animal excrement with paper mill sludge; in this embodiment of the invention, the end-product has a coarser texture than when animal excrement is used alone, which may be more suitable for certain applications.

The term "animals" as used herein in the specification and in the claims section below refers to any member of the kingdom Animalia, which includes multicellular organisms that have a well-defined shape, controlled growth, can move voluntarily, actively acquire food and digest it internally, and have sensory and nervous systems that allow them to respond rapidly to external stimuli. The term specifically refers to animals grown in captivity, either mammals or birds, especially animals grown for commercial purposes such as, but not limited to, cows, goats, porcine, chicken, etc.

The term "herbivorous animals" as used herein is intended to include cows, sheep, goats, horses, donkeys, camelids, elephants, birds grown in captivity, for example, but it will be appreciated that this is not an exhaustive list and that many other animals fall within this category.

In step (b) of the process, the initial feed is mixed with water, and this may be effected in any convenient manner, e.g., by using a mechanical macerator or mixer and/or an agitator, or a combination thereof. In general, it is preferred that the ratio of initial solid feed to water falls within the range of about 1:1 to about 1:4 by volume.

In step (c) of the process, the aqueous mixture is subjected to treatment with an alternating electric current (AC) at a frequency within the range of 5 Hz–200 kHz, for a period of time (by way of example only this could fall within the range of about 5 seconds to about 10 minutes) such that following the treatment and after subsequent process step (d), the recovered solid product is odorless, microbiologically sterile, porous and is capable of absorbing several times its own weight of water. The AC preferably has a potential within the range of about 10 to about 1,000 volts.

While the present invention is not to be regarded as limited by any theory, it has been noted that since both, the chemical oxygen demand (COD) and biological oxygen demand (BOD) have been found to be reduced in the product, compared with a similar product in which the initial mixture was not subjected to an alternating electric current (vide infra), there is a possibility that having regard to the fact that the product is more oxidized than the starting material, atmospheric oxygen plays a role in the process of the invention.

Moreover, it has been found by microscopic examination that the product contains plant cells, the membranes of which have been ruptured in the process. The recovered solid product, after step (d), i.e., after separating excess aqueous liquid, e.g., by using a press screw separator or centrifuge, contains usually 50% water, and is capable of absorbing at least three times, preferably at least six times (e.g., x5–10) its own weight of water.

In a particular embodiment of the invention, the initial material comprises a mixture of animal excrement with paper mill sludge, falls within the range of about 1:10 to about 10:1 by volume.

The apparatus of the invention for the manufacture of a solid product in accordance with the process defined herein, includes in operative combination four mechanism.

A first mechanism of the apparatus serves for providing a substantially solid feed including excrement from animals. The first mechanism may, for example, be one more hoppers as known in the art.

A second mechanism of the apparatus serves for forming an aqueous mixture of the substantially solid feed with water. As stated above, the second mechanism may, for example, be a mechanical macerator or mixer and/or an agitator, or a combination thereof.

A third mechanism of the apparatus according to the present invention serves for separating excess liquid from the product resulting from the reactor mechanism which is described below in greater detail and for recovering the desired solid product. The third mechanism may, for example, be a press screw separator or centrifuge.

Figure 2:
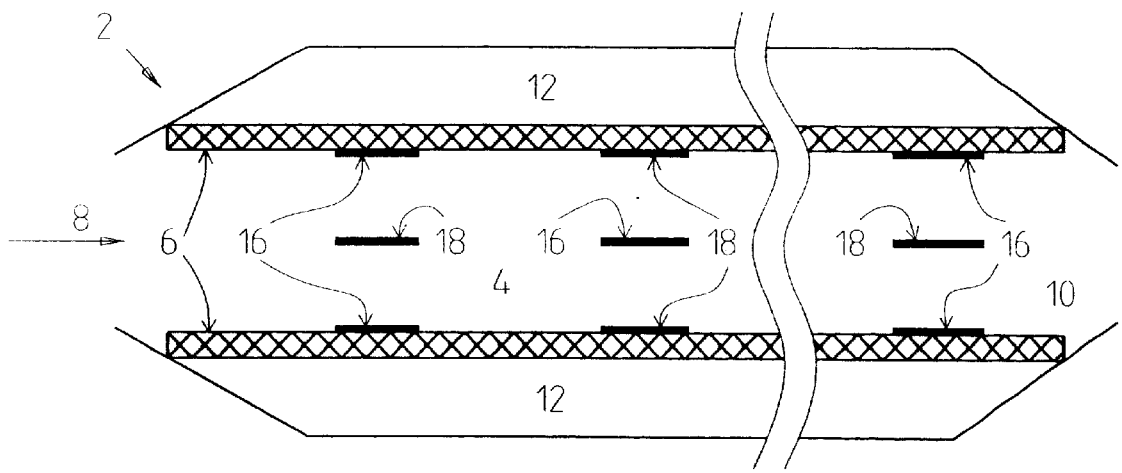
FIG. 2 illustrates another embodiment of a reactor of the invention, useful in the process of the invention and which may form part of the apparatus of the invention.
Figure 3A:
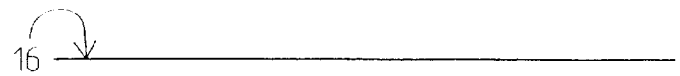
FIGS. 3a–g depict illustrative embodiments arrangements of electrodes useful in the present invention.
Figure 3A:
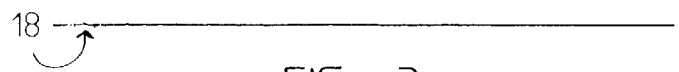
Figure 3B:
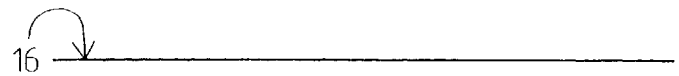
Figure 3B:
Figure 3B:
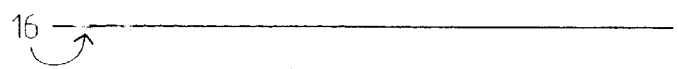
Figure 3C:
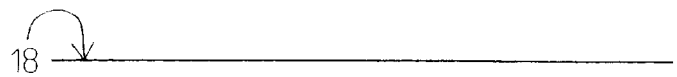
Figure 3C:
Figure 3C:
Figure 3D:
Figure 3D:
Figure 3D:
Figure 3D:
Figure 3D:
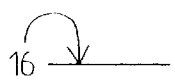
Figure 3D:
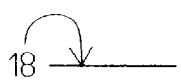
Figure 3E:
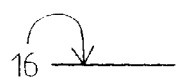
Figure 3E:
Figure 3E:
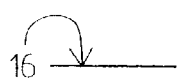
Figure 3E:
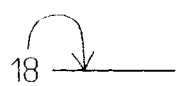
Figure 3E:
Figure 3E:
Figure 3E:
Figure 3E:
Figure 3E:
Figure 3F:
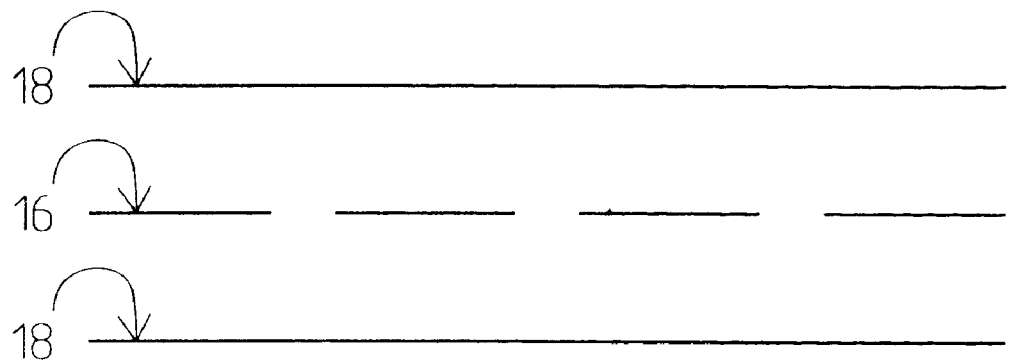
Figure 3G:
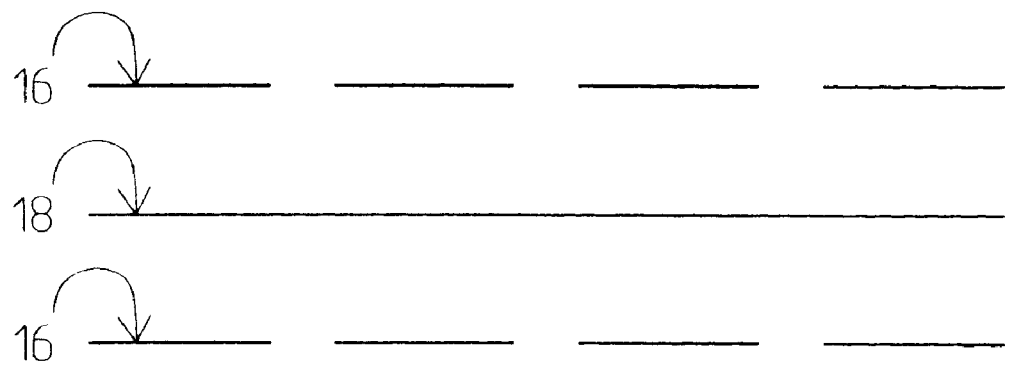

A reactor mechanism, which per se also forms part of the present invention, may include, illustratively, with reference to FIGS. 1 and 2 (which are not drawn to scale) of the accompanying drawings, a generally elongate, tubular reactor 2 defining a reactor space 4 bounded by an insulated wall 6, inlet 8 and outlet 10 for flowing aqueous mixture through reactor space 4 in the direction of the arrow, and phase and zero electrodes, 16 and 18, respectively, cooperatively disposed within reactor space 4 and connected to supply of alternating electric current (e.g., via source 14 in FIG. 1) having a frequency within the range of 5 Hz–200 kHz, thereby providing mechanism for applying alternating electric current to the aqueous mixture when the latter flows through reactor space 4.

A peripheral zone 12 of reactor 2 is maintained sealed from reactor space 4 and is utilized for electric supports, electric cables, electronic feedback and so forth. By way of exemplary non-limitative illustration only, the reactor space may be 2 m in diameter, and may be manufactured from PVC, and the electrodes may be of stainless steel.

FIGS. 3a–g of the accompanying drawings show a number of illustrative and largely self-explanatory arrangements of the phase electrode(s) 16 and the zero electrodes 18 (not necessarily drawn to scale), within the reactor space. It will be appreciated that phase and zero electrodes are disposed parallel to each other and generally transverse to the flow of the treated material flowing through the reactor. In general, the distance between phase electrodes is greater than between phase and zero electrodes, and these distances will be generally proportional to the applied voltages.

The electrical parameters can be maintained constant by electric feedback and control in known manner, while the conductivity of the flowing treated material may be varied according to concentration and type of treated material and the temperature. However, the reactant flow is generally adequate to cool the heat generated at the electrodes and no additional cooling is usually required.

Figure 4:
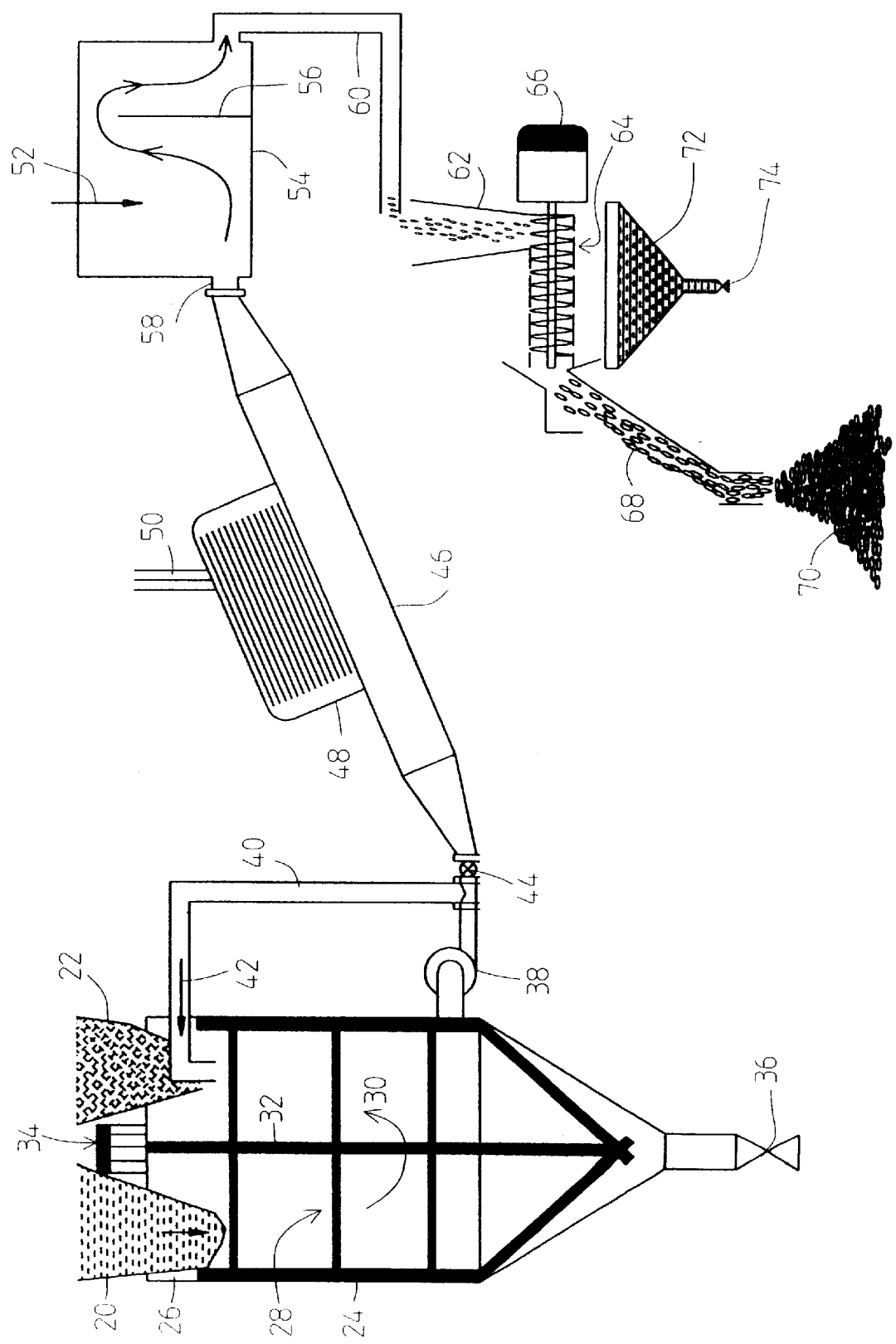
FIG. 4 illustrates an embodiment of the apparatus of the invention.

Without prejudice to the generality of the parameters of the present invention, the apparatus depicted in FIG. 4 represents a presently preferred embodiment of the apparatus of the invention, which enables the process of the invention to be practiced in a continuous manner. The initial feed consists of e.g., raw cow manure, or a mixture thereof with paper mill sludge, fed to mixing vessel 24 via hoppers 20 and 22 (respectively, where the feed is the stated mixture of components). Water is fed simultaneously to vessel 24 by mechanism of conduit 26. The ratio manure (or its mixture with paper mill sludge) to water is e.g., about 1:2 by volume. The aqueous composition is thoroughly mixed with stirrer 28 which is rotated in the direction shown by arrow 30 about axis 32, by motor 34. In order to ensure more efficient mixing of the composition to be treated, a portion is recirculated to vessel 24 by mechanism of pump 38 and conduit 40, in the direction of arrow 42. Simultaneously, a portion of the composition is pumped upwards via valve 44 through tubular reactor 46, the electrical supply and feedback mechanism of which is indicated schematically at 48, electricity being supplied at e.g., 380 volts AC and 100 Hz, via cables 50. The residence time of the mixture in reactor 46 may be varied as stated above, but is typically about 15 seconds, about 30 seconds, or about one minute. The treated mixture is conducted via conduit 58 to intermediate vessel 54 with baffle 56, to which water may be added at 52 to ensure efficient flow of the reaction product in the direction of the long arrow to exit conduit 60 and thence to hopper 52 which supplies screw separator 64, operated by motor 66. The desired reaction product is shown at 68 after exiting from separator 64, and finally passes by gravity to 70 where it collects and may be removed by a mechanism not shown.

The effluent liquid separated collects in vessel 72 and is removed by valve 74. If desired, it may be in part recirculated to vessel 24 by a mechanism not shown, provided that at least some fresh water is used. The effluent, which is rich in plant nutrients, may be used for irrigation or for the preparation of fertilizers. Typical data for the product (determined by the Israel Ministry of Agriculture and also by a private laboratory) are as follows, where raw manure was processed in the manner described:

|  | without treatment | after treatment |
|---|---|---|
| TSS* | 3640 | 3420 |
| COD | 12560 | 9770 |
| BOD | 10800 | 8780 |

*total suspended solids, mg/l

The data in the above Table shows that the process of the invention is ecologically-friendly and that it is possibly an oxidative process.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A process for the manufacture of a product useful as an artificial soil, soil conditioner or peat substitute, comprising the step of subjecting an aqueous mixture containing a substantially solid feed excrement from animals and water to treatment with an alternating electric current at a frequency of a predetermined magnitude and for a predetermined period of time, such that an odorless solid product capable of absorbing several times its own weight of water is recoverable by water removal.

2. The process of claim 1, wherein the steps are further characterized by at least one of the following parameters:
   (i) said animals are herbivorous animals;
   (ii) a ratio of said substantially solid feed to water falls within a range of about 1:1 to about 1:4 by volume;
   (iii) said alternating electric current has a potential within a range of about 10 to about 1000 volts;
   (iv) said time period falls within a range of about 5 seconds to about 10 minutes;
   (v) said recovered solid product is capable of absorbing at least six times its own weight of water;
   (vi) said frequency of said predetermined magnitude is in a range of 5 Hz–200 kHz;
   (vii) when recovered said odorless solid product is capable of absorbing 3–10 times its own weight of water;
   (viii) said odorless solid product is also biologically sterile.

3. The process of claim 1, wherein said treatment is effected by flowing said aqueous mixture through a reactor, said reactor including a mechanism for providing said alternating electric current.

4. The process of claim 1, wherein said substantially solid feed includes raw animal excrement.

5. The process of claim 1, wherein said substantially solid feed includes a mixture of animal excrement with paper mill sludge.

6. The process of claim 5, wherein a ratio of animal excrement to paper mill sludge, falls within a range of about 1:10 to about 10:1 by volume.

7. An odorless, microbiologically sterile and porous product capable of absorbing several times its own weight of water, useful as an artificial soil, soil conditioner or peat substitute, and which is obtainable by the process defined in claim 1.

8. A product useful as an artificial soil, soil conditioner or peat substitute comprising an electrically treated excrement from animals, the product being odorless, porous, microbiologically sterile and capable of absorbing several times its own weight of water.

9. An apparatus for the manufacture of an odorless and porous solid product capable of absorbing several times its own weight of water, useful as an artificial soil, soil conditioner or peat substitute, the apparatus comprising a line including in sequence:
   (a) a first mechanism for providing a substantially solid feed including excrement from animals into the apparatus;
   (b) a second mechanism for forming an aqueous mixture of said substantially solid feed with water;
   (c) a reactor mechanism for subjecting said aqueous mixture to treatment with an alternating electric current at a predetermined frequency; and
   (d) a third mechanism for separating excess liquid from a product resulting from said reactor mechanism and for recovering the solid product.

10. The apparatus of claim 9, wherein said reactor mechanism includes a generally elongate, tubular reactor defining a reactor space bounded by insulated wall mechanism, inlet and outlet mechanism for flowing aqueous mixture through said reactor space, and phase and zero electrodes cooperatively disposed within said reactor space and connected to a supply of alternating electric current having a frequency within the range of 5 Hz–200 kHz, thereby providing mechanism for applying said current to said aqueous mixture when said mixture flows through said reactor space.

11. A reactor mechanism for use in an apparatus for the manufacture of an odorless and porous solid product capable of absorbing several times its own weight of water, useful as an artificial soil, soil conditioner or peat substitute, the reactor mechanism comprising a reactor defining a reactor space bounded by insulating wall mechanism, said reactor including inlet and outlet mechanisms for flowing aqueous mixture through said reactor space, and phase and zero electrodes being cooperatively disposed within said reactor space and being connected to a supply of alternating electric current having a predetermined frequency, thereby providing mechanism for applying said current to said aqueous mixture when said mixture flows through said reactor space.

12. The reactor mechanism of claim 11, wherein said predetermined frequency falls within a range of 5 Hz–200 kHz.

* * * * *